United States Patent [19]

Landry

[11] Patent Number: 5,003,599

[45] Date of Patent: Mar. 26, 1991

[54] IN-BAND FRAMING METHOD AND APPARATUS

[75] Inventor: James Landry, Germantown, Md.

[73] Assignee: Simulation Laboratories, Inc., Germantown, Md.

[21] Appl. No.: 306,959

[22] Filed: Feb. 7, 1989

[51] Int. Cl.$^5$ .......................... H04J 3/06; H04K 1/00
[52] U.S. Cl. ............................................ 380/48; 380/9; 380/50; 370/100.1
[58] Field of Search ..................... 370/105, 100.1; 371/47.1, 49.1; 364/200, 900; 380/48, 9, 50

[56] References Cited

U.S. PATENT DOCUMENTS

| | | | |
|---|---|---|---|
| 3,659,046 | 4/1972 | Angeleri et al. | 380/43 |
| 3,872,257 | 3/1975 | Kardt et al. | 370/102 |
| 3,928,726 | 12/1975 | Colton et al. | 370/105 |
| 3,940,736 | 2/1976 | Inaba et al. | 371/47.1 |
| 3,950,616 | 4/1976 | Tammaru | 375/114 |
| 4,392,241 | 7/1983 | Hurst | 380/33 |
| 4,410,990 | 10/1983 | Wilkinson | 371/47.1 |
| 4,433,425 | 2/1984 | de Jaeger | 375/113 |
| 4,591,673 | 5/1986 | Lee et al. | 380/28 |
| 4,598,169 | 7/1986 | Komatsubara et al. | 380/36 |
| 4,639,548 | 1/1987 | Oshima et al. | 380/43 |
| 4,680,766 | 7/1987 | Wilkinson | 371/47.1 |
| 4,682,334 | 7/1987 | LeMovel et al. | 371/49.1 X |
| 4,689,606 | 8/1987 | Sato | 380/46 |
| 4,719,643 | 1/1988 | Beeman | 375/115 |

Primary Examiner—Stephen C. Buczinski
Assistant Examiner—Bernarr Earl Gregory
Attorney, Agent, or Firm—David B. Newman, Jr. & Associates

[57] ABSTRACT

An in-band framing encoder, for continuously operating on bit stream having external-framing data and payload data. The bit stream includes a plurality of time-division-multiplexed frames of payload data achieving channel integrity with external-framing data. The encoder comprises a framing-bit detector and a framing-bit remover for detecting the external-framing data of the bit stream, and removing the external-framing data from the bit stream. A unique-bit-pattern generator generates a unique-bit-pattern sequence. A multiplexer multiplexes the unique-bit-pattern sequence with payload data over the plurality of time-division-multiplexed frames of payload data, thereby generating internally-reframed data having the unique-bit-pattern sequence multiplexed with the payload data. The in-band framing decoder continuously operates on internally-reframed data having a unique-bit-pattern sequence multiplexed with payload data, wherein the internally-reframed data includes a plurality of time-division-multiplexed frames of payload data having channel integrity maintained with the unique-bit-pattern sequence. The decoder further comprises a synchronizer for detecting the unique-bit-pattern sequence in the internally-reframed data. In response to detecting the unique-bit-pattern sequence the synchronizer generates a synchronization signal. A unique-bit-pattern-sequence masker responsive to the synchronization signal for masks the unique-bit-pattern sequence in the internally-reframed data, thereby generating second-payload data. A channelizer means is responsive to the synchronization signal, inserts external-framing data into the second-payload data.

35 Claims, 16 Drawing Sheets

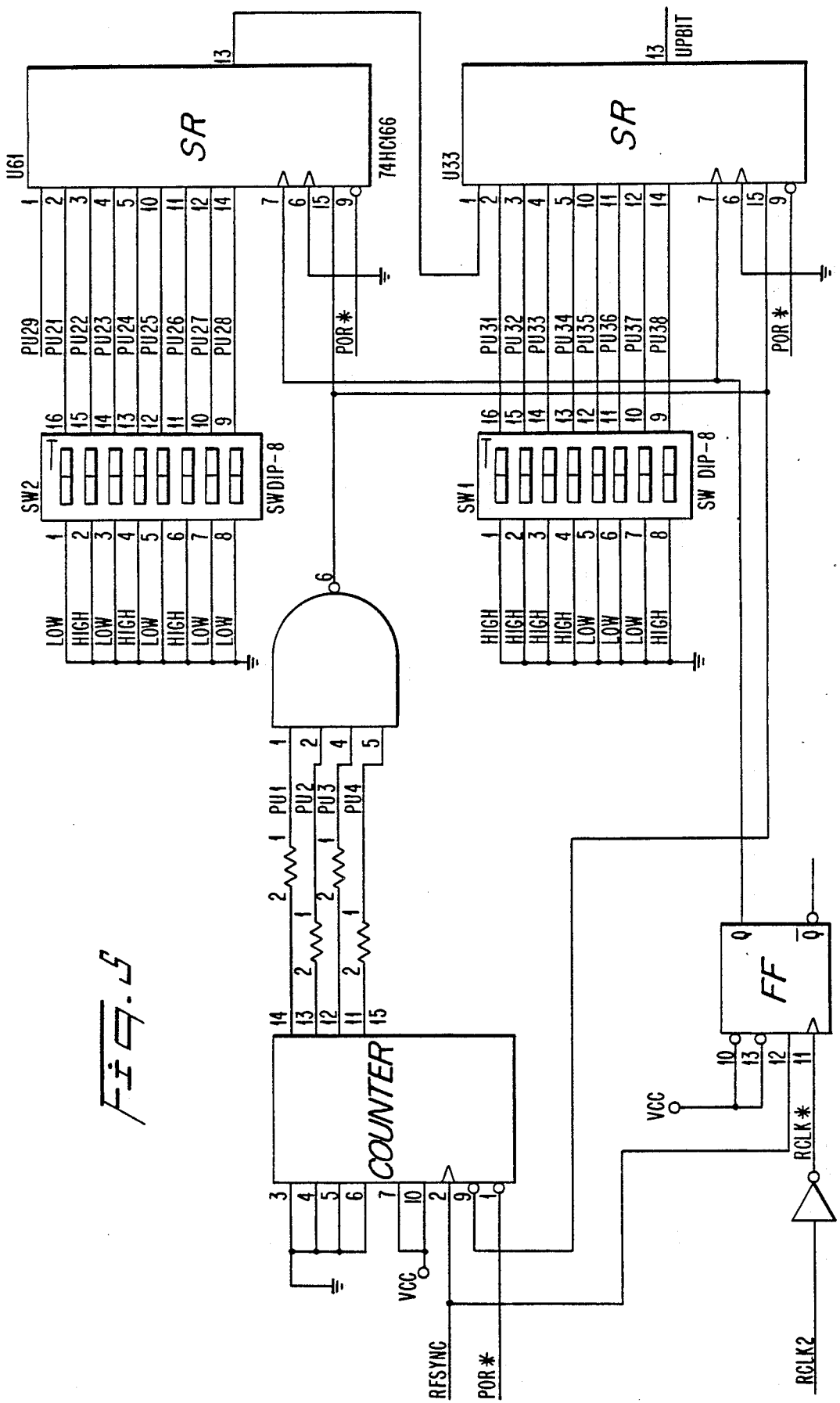

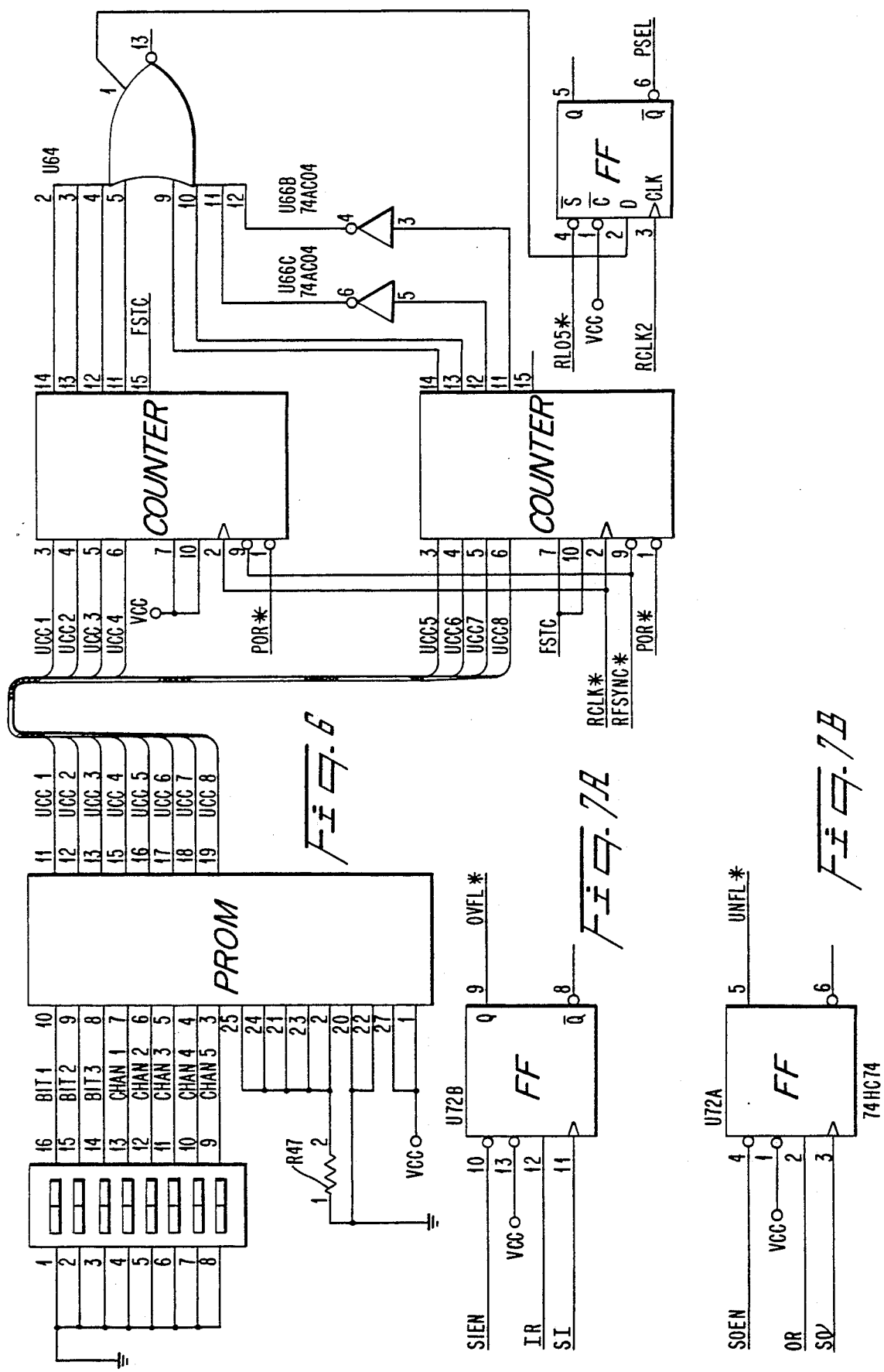

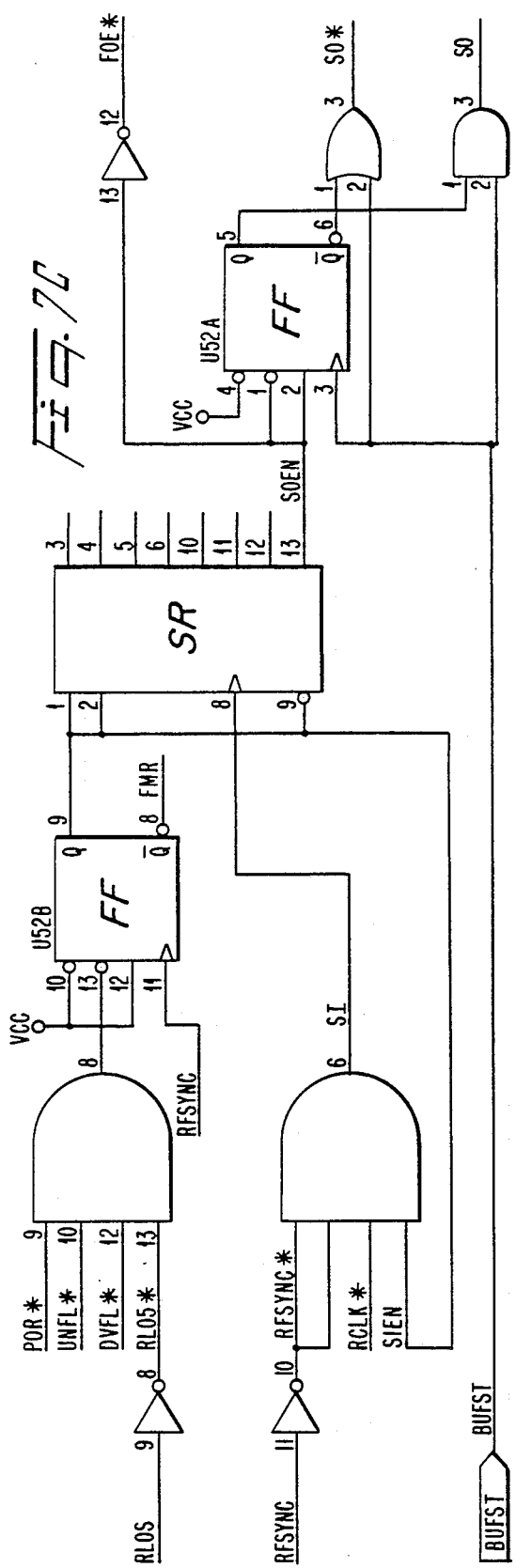
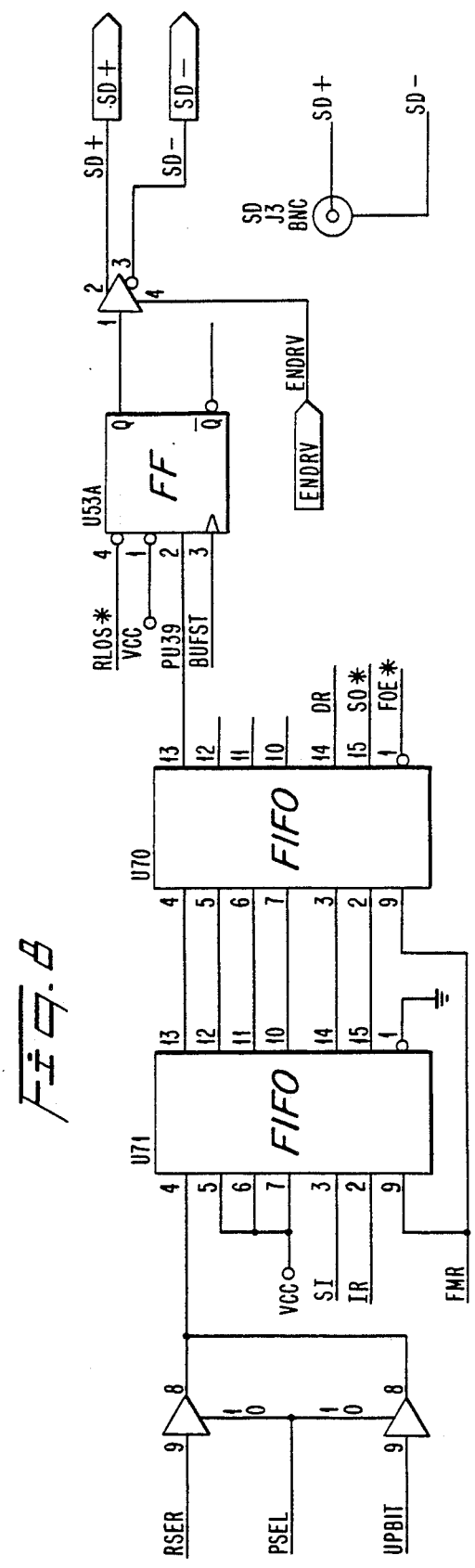

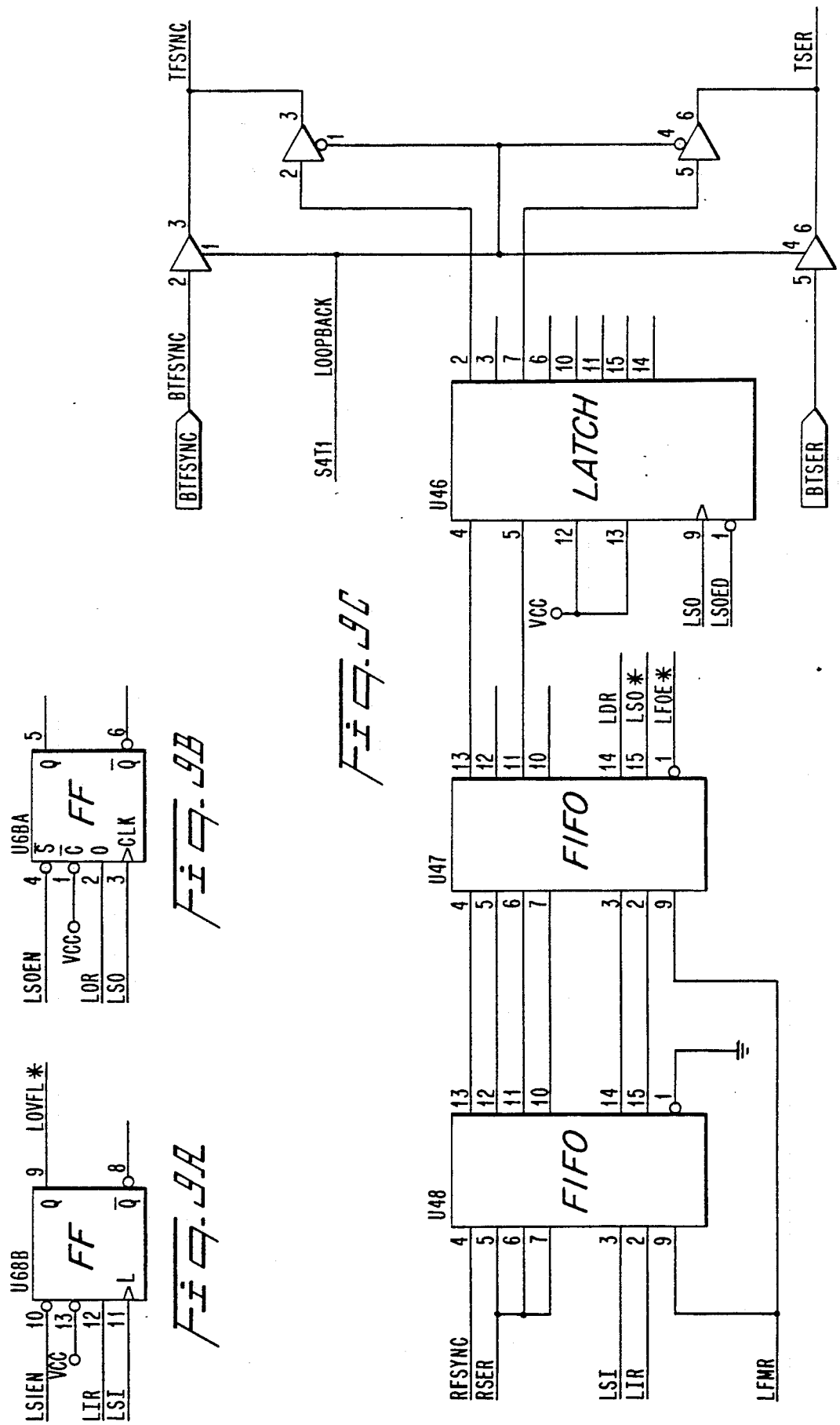

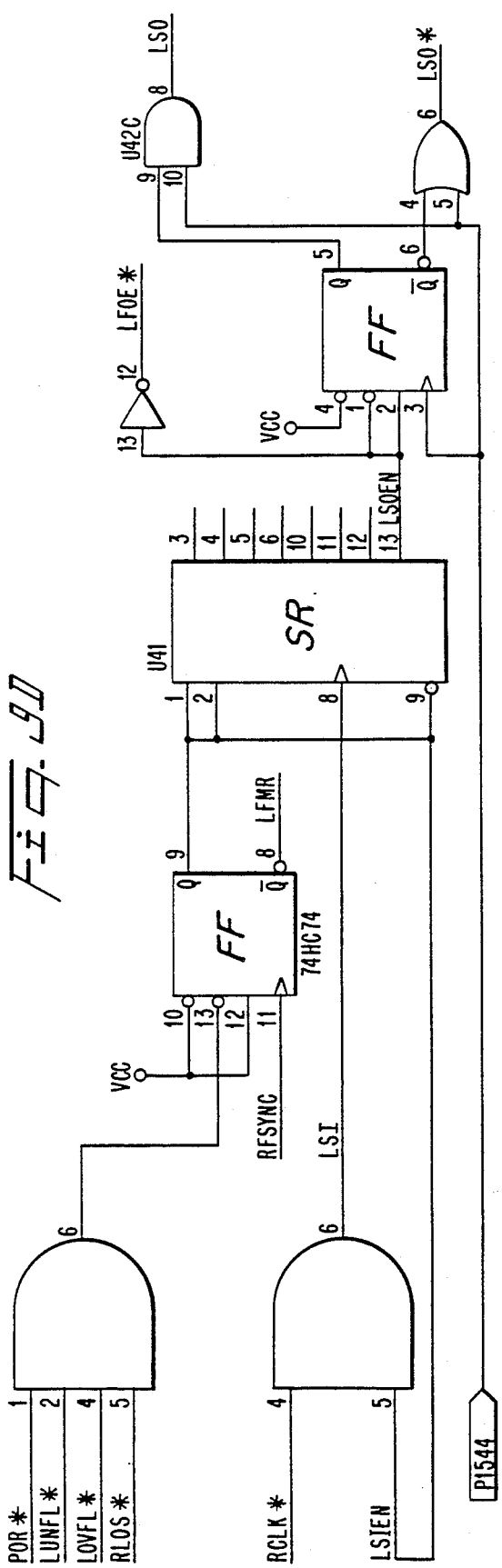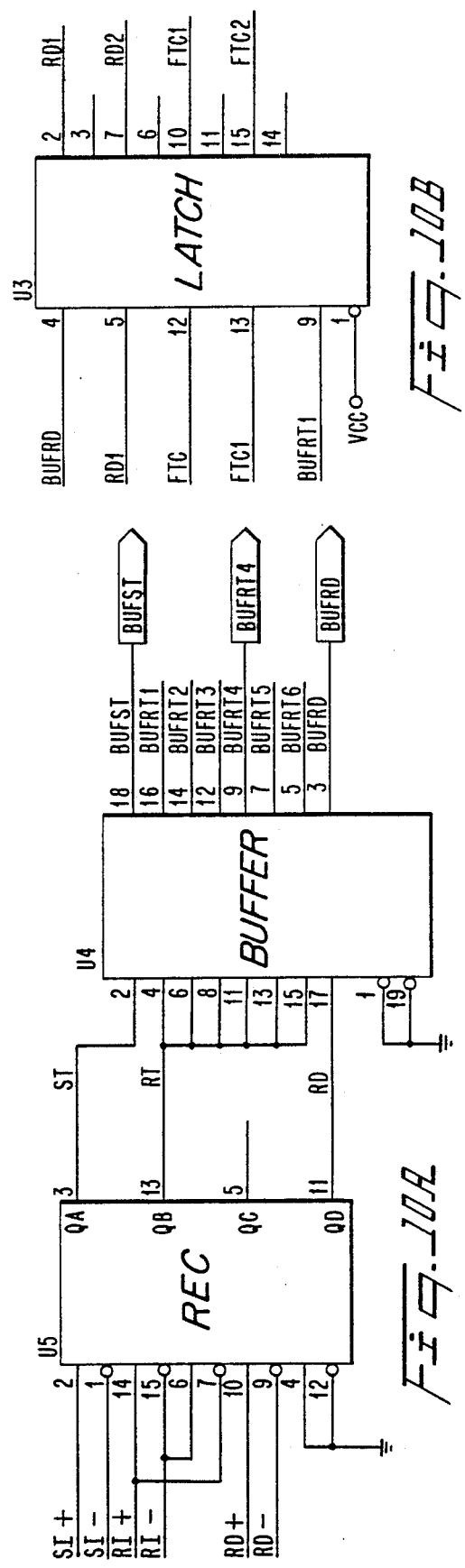

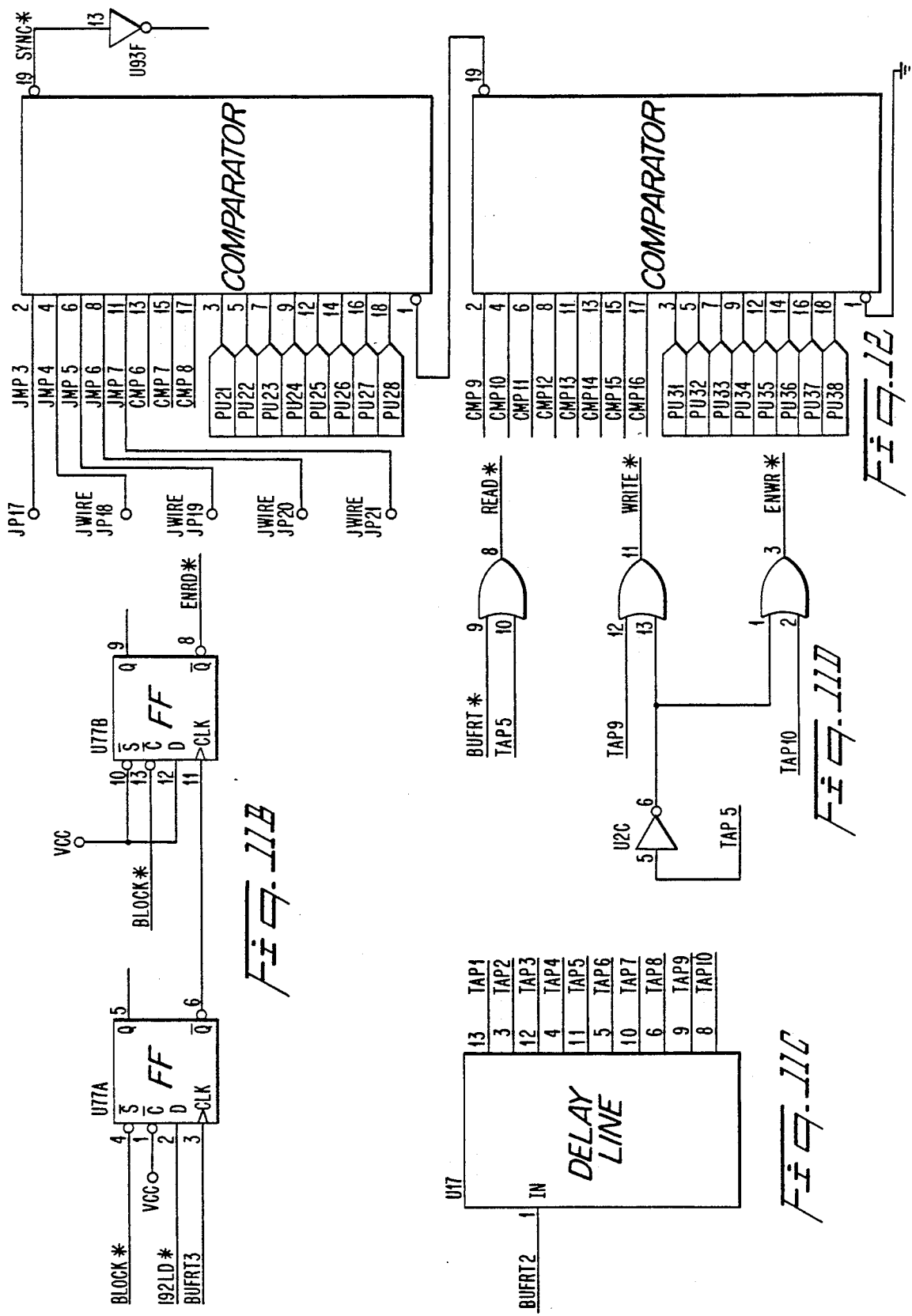

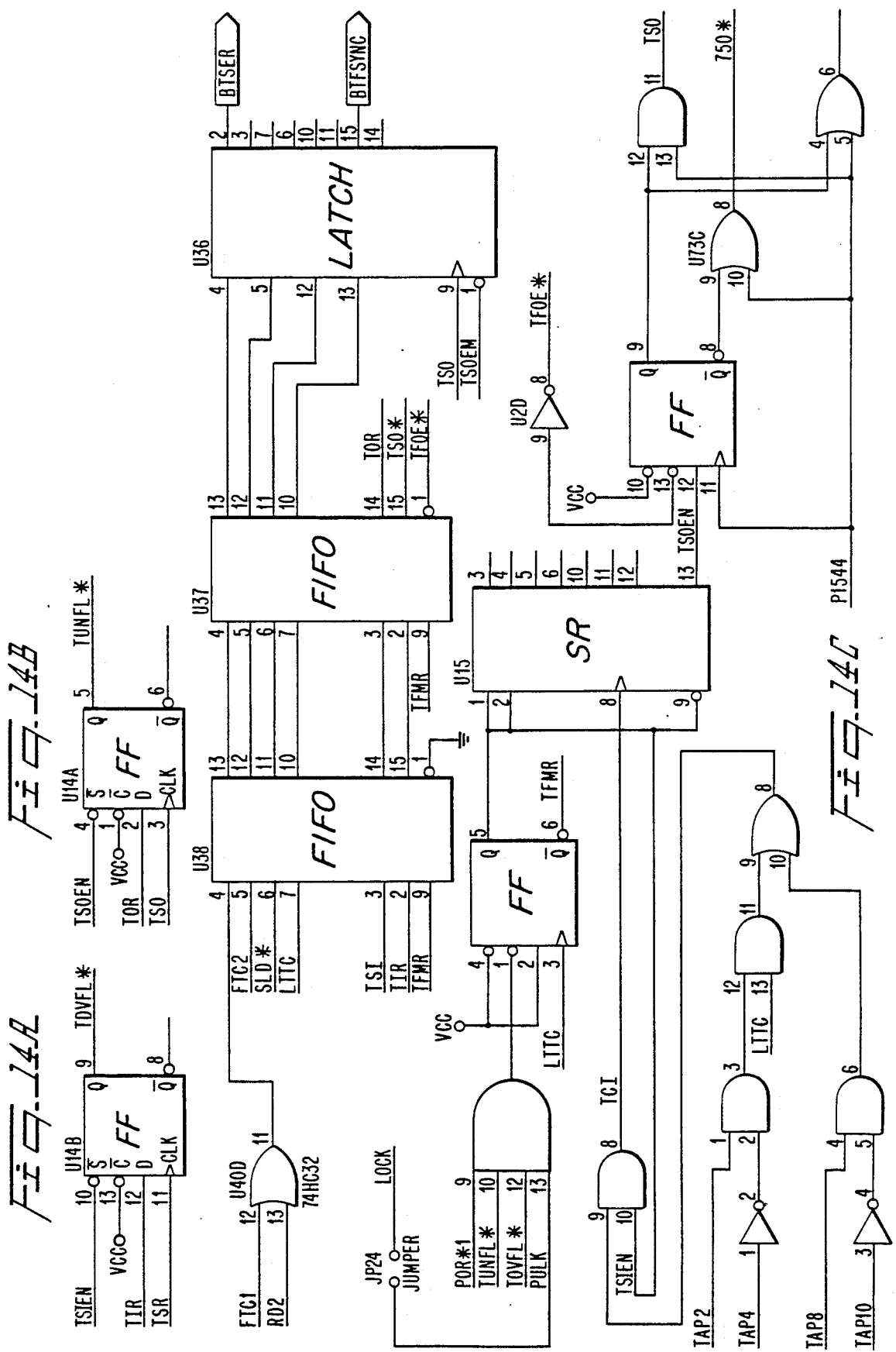

IN-BAND FRAMING METHOD AND APPARATUS

BACKGROUND OF THE INVENTION

This invention relates to an in-band framing apparatus, and more particularly to an in-band framing apparatus comprising an an in-band framing encoder and decoder capable of maintaining channel integrity of time division multiplexed signals which are encrypted and transmitted over public communications networks such as the T1 network.

DESCRIPTION OF THE PRIOR ART

Data, hereinafter called a bit stream, transmitted over a public communications network such as the T1 network comprise payload data and external-framing data. For the T1 network the bit stream is transmitted at a data rate of 1.544 Mbps. The external-framing data and payload data typically come from a multiplexer. The payload data may include a plurality of user channels, and for the T1 network, occupy 1.536 Mbps capacity of the bit stream. The external-framing data provide the necessary framing information for the T1 network, and maintain channel integrity of the payload data. For the T1 network, the external-framing data are every 193 d bit in the bit stream, which is 8 Kbps capacity of the bit stream.

Utilizing commercially available T1 circuits for military/government encrypted networks poses several difficult interfacing issues. Local exchange carrier (LEC) T1 circuits operate using a DS1 bipolar interface and require that T1 framing be preserved. Government specified encryption devices, most prominently the KG94, KG94A and KG81, operate at Mil 188-114, and actually scramble the entire 1.544 Mbps bit stream, including the external-framing data and the payload data. Without interface devices for preserving the framing and providing interface conversion, Mil 188-114 to DS1, these encryption devices cannot be used in publicly available circuits, such as the T1 circuit.

In the prior art the problem has been addressed in one of three ways:

1. Encrypted communications networks have not used publicly available networks such as T1, but instead have used a series of tie lines.

2. Private networks for encrypted communications have been built at great expense between user sites. These encrypted networks may include specially built terrestrial facilities, microwave or on-site satellite earth stations. Such private networks can be constructed so that they do not require framing to be preserved. Interface conversion can be achieved through an addition of a device that does nothing but Mil 188-114 to DS1 conversion.

3. The network is not encrypted. Assuming that a private network has an encryption-security requirement, the major problems with the foregoing approaches are:

1. The user is forsaking the economy, flexibility, and quality that the publicly available networks such as T1 offer. For a privately encrypted-secure network, the cost increases due to overhead including managing and securing each communications line.

2. Private communications networks can be extremely costly to construct and may take months or years to implement.

Additionally, in a private communications network encryption devices may not detect when a circuit has lost synchronization, and thus continue to transmit data.

OBJECTS AND SUMMARY OF THE INVENTION

An object of the present invention is to provide an apparatus that will preserve channel and system signaling integrity so that the encrypted T1 network can be deployed over readily available commercial transmission facilities.

A further object of the invention is to detect out-of-synch conditions in the network and initiate in the encryption device the resynchronization process.

An additional object of the present invention is to provide an in-band framing apparatus for maintaining channel integrity of time-division-multiplexed data over the internally-reframed T1 network.

A still further object of the invention is to provide an in-band framing apparatus which is simple to use.

According to the present invention, as embodied and broadly described herein, an in-band framing apparatus having a data input and a data output is provided comprising an in-band framing encoder and decoder. The in-band framing encoder is for transmitting data over a data network, and comprises detecting means, removing means, pattern means, and multiplexer means. The in-band framing encoder continuously operates on a bit stream which includes external-framing data and payload data. The bit stream, transmitted at a bit rate, has a plurality of time-division-multiplexed frames of payload data with channel integrity maintained with external-framing data. The detecting means is coupled to the data input and detects the external-framing data of the bit stream. The removing means is coupled to the detecting means for removing the external-framing data from the bit stream. The pattern means generates a unique-bit-pattern sequence. The multiplexer means is coupled to the removing means and the pattern means, and to the data output. The multiplexer means multiplexes the unique-bit-pattern sequence from the pattern means with payload data from the removing means over the plurality of time-division-multiplexed frames of payload data, thereby generating internally-reframed data. Thus, the multiplexer means generates internally-reframed data having the unique-bit-pattern sequence multiplexed with the payload data, and outputs the internally-reframed data from the data output at the internally-reframed-data rate.

The in-band framing decoder continuously operates on internally-reframed data having a unique-bit-pattern sequence multiplexed with payload data. The internally-reframed data, transmitted at a internally-reframed-data rate, includes a plurality of time-division-multiplexed frames of payload data having channel integrity maintained with the unique-bit-pattern sequence multiplexed with the payload data. The in-band framing decoder includes synchronization means, masking means, and channelization means. The synchronization means is coupled to the data input for detecting the unique-bit-pattern sequence embedded in a plurality of frames of payload data of the internally-reframed data. In response to detecting the unique-bit-pattern sequence the synchronization means generates a synchronization signal. The masking means is coupled to the synchronization means and is responsive to the synchronization signal for masking the unique-bit-pattern sequence in the internally-reframed data. Thus, the masking means generates second-payload data. The channelization means is coupled to the synchronization means and to the data output. In response to the synchronization signal, the channelization means generates a bit stream by inserting external-framing data into the second-payload data and outputs the bit stream at a bit rate.

Additional objects and advantages of the invention will be set forth in part in the description which follows, and in part will be obvious from the description, or may be learned by practice of the invention.

BRIEF DESCRIPTION OF THE DRAWINGS

The accompanying drawings, which are incorporated in and constitute a part of this specification, illustrate a preferred embodiment of the invention, and together with the description, serve to explain the principles of the invention.

FIG. 5 is a schematic diagram of a unique-bit-pattern generator according to the present invention;

FIG. 6 is a schematic diagram of a unique-bit-pattern insertion logic according to the present invention;

FIGS. 7A-7C are a schematic diagram of a unique pattern first-in-first-out memory controller according to the present invention;

FIG. 8 is a schematic diagram of a multiplexer and external-framing deletion according to the present invention;

FIGS. 9A-9D are a schematic diagram of T1 loopback logic according to the present invention;

FIGS. 10A and 10B are a schematic diagram of an interface circuit according to the present invention;

FIGS. 11A-11D are a schematic diagram of a shift-register chain;

FIG. 12 is a schematic diagram of a synchronization detector according to the present invention;

FIGS. 14A-14C are a schematic diagram of a unique-bit-pattern sequence masker and data buffer according to the present invention;

FIG. 15 is schematic diagram of an in-band frame-lock detector according to the present invention;

DETAILED DESCRIPTION OF THE PREFERRED EMBODIMENTS

Reference will now be made to the present preferred embodiments of the invention, examples of which are illustrated in the accompanying drawings.

Figure 1:
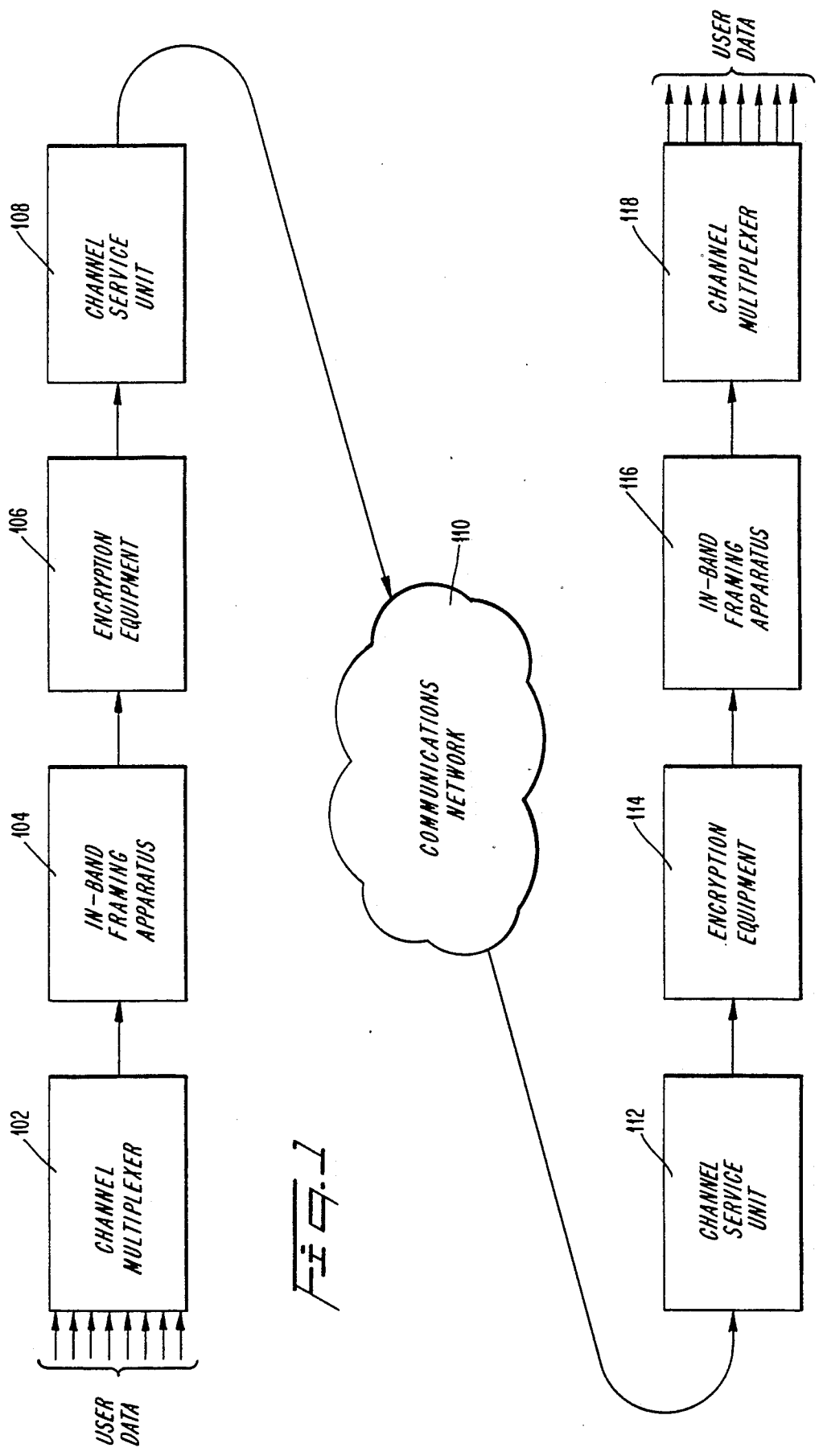
FIG. 1 is a communications system using the in-band framing encoder and decoder.

Referring to FIG. 1, a conceptual system configuration employing the in-band framing apparatus of the present invention is shown, including channel multiplexer 102, in-band framing apparatus 104, encryption equipment 106, channel service 108, communications network 110, channel service unit 112, encryption equipment 114, in-band framing apparatus 116, and channel multiplexer 118. Payload data, including voice, data, or video, from a plurality of channels are multiplexed in channel multiplexer 102. The channel multiplexer 102 time-division-multiplexes the payload data. A bit stream in the T1 network includes external-framing data transmitted at 8 Kbps and payload data transmitted at 1.536 Mbps. The external-framing data provide the necessary information for demultiplexing the plurality of channels entering channel multiplexer 102.

The channel multiplexer 102 is coupled to the in-band farming apparatus 104, which includes an in-band framing encoder, wherein the external-framing data are stripped from the bit stream, resulting in the bit stream having only payload data. Additionally, the in-band framing apparatus 104 adds a unique-bit-pattern sequence to the payload data by multiplexing the unique-bit-pattern sequence with the payload data. The payload data multiplexed with the unique-bit-pattern sequence are called the internally-reframed data, and for the T1 network are outputted from the in-band framing apparatus 104 at 1.536 Mbps. The internally-reframed data enter the encryption equipment 106, which might be, for example, a KG94A. The encrypted data outputted from the encryption unit 106 pass through a channel service unit 108 which adds a framing bit as every 193 d bit. The channel service unit 108 outputs data into the communications network 110 at 1.544 Mbps. Channel service unit 112 receives the data from the communications network 110 at 1.544 Mbps, and removes the previous added framing bit, which was added by channel service unit 108. Channel service unit 112 transfers unframed encrypted data at 1.536 Mbps to encryption equipment 114. Encryption equipment 114 decrypts the encrypted data and outputs internally-reframed data. In-band framing apparatus 116, which includes an in-band framing decoder, searches for the unique-bit-pattern sequence embedded in the internally-reframed data, and masks the unique-bit-pattern sequence in the internally-reframed data as "1" bits. The in-band framing apparatus 116, in response to detecting the unique-bit-pattern sequence, also resynchronizes a timer from the detected unique-bit-pattern sequence in the internally-reframed data, and inserts external-framing data necessary for the channel multiplexer 118 to demultiplex the data. The external-framing data is generated from the timer, which is keyed from detecting the unique-bit-pattern sequence Accordingly, a reframed-bit stream is passed from in-band-framing apparatus 116 to channel multiplexer 118, and that reframed-bit stream is demultiplexed.

Figure 2:
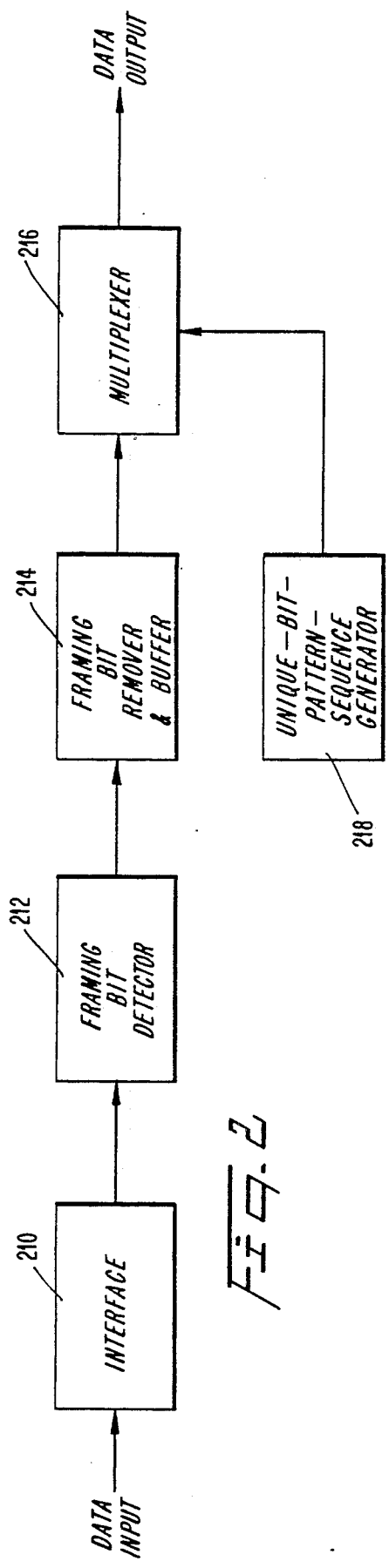
FIG. 2 is a block diagram of an in-band framing encoder according to the present invention.

An in-band-framing encoder, according to the present invention, having a data input and a data output, is shown in FIG. 2. The in-band framing encoder continuously operates on bit stream. The bit stream include external-framing data and user data. The bit stream, which is transmitted at a bit rate, have a plurality of time-division-multiplexed frames of payload data with channel integrity maintained by the external-framing data.

In the exemplary arrangement shown, the encoder includes an interface 210, deletion means, pattern means, and multiplexer means. The deletion means may include detecting means and removing means. The detecting means may be embodied as framing-bit detector 212, the removing means may be embodied as framing-bit remover 214, the pattern means may be embodied as the unique-bit-pattern-sequence generator 218, and the multiplexer means may be embodied as multiplexer 216.

The in band framing encoder has the interface 210 connected to the framing-bit detector 212. The framing-bit detector 212 is connected to the framing-bit remover 214, and the framing-bit remover 214 and the unique-bit-pattern-sequence generator 218 are connected to the multiplexer 216. The interface 210 is coupled to the data input, and the multiplexer 216 is coupled to the data output.

The framing-bit detector 212 detects the external-framing data in the bit stream. In response to detecting the external-framing data, the framing-bit remover 214 removes the external-framing data from the bit stream. The resulting payload data are outputted from framing-bit remover 214. The unique-bit-pattern-sequence generator 218 generates a unique-bit-pattern sequence, and the multiplexer 216 multiplexes the unique-bit-pattern sequence with the payload data which are coming from the framing-bit remover 214. The unique-bit-pattern sequence is multiplexed over a plurality of frames of payload data, thereby generating internally-reframed data. For example, the unique-bit-pattern sequence may be a 16 bit sequence with the 16 bits multiplexed over 16 frames of payload data. As such, one of each of the 16 bits is multiplexed in each one of the frames of payload data. The bits typically are not multiplexed in the same location per frame of the payload data, but are multiplexed at different locations for each frame, based on a predetermined algorithm. The predetermined algorithm may be reprogrammed for a particular application.

Figure 3:
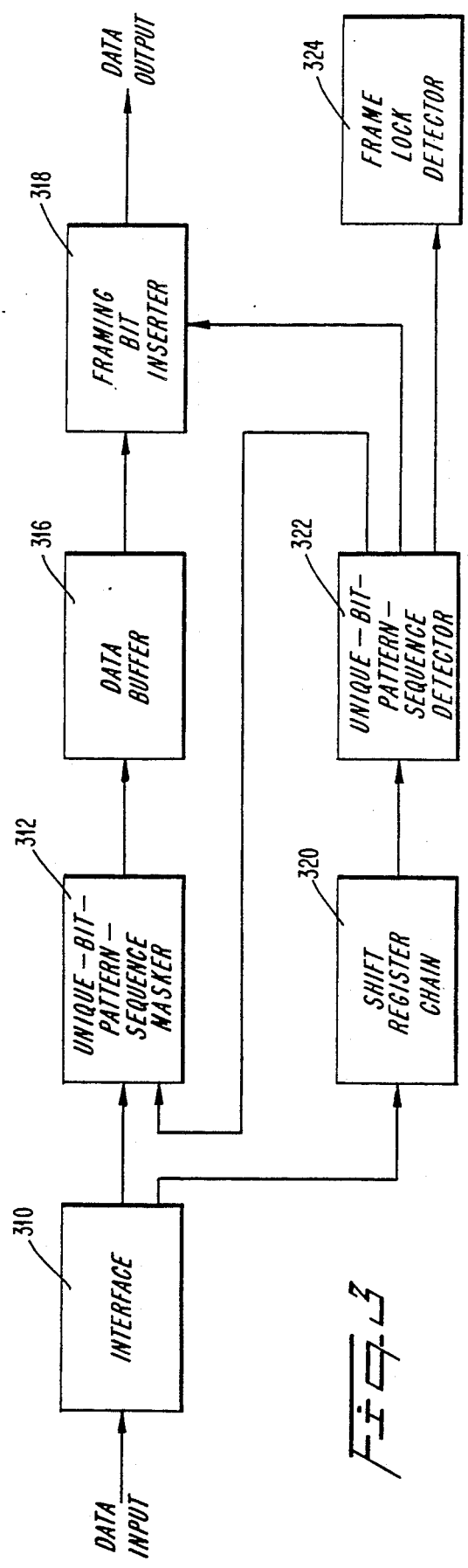
FIG. 3 is a block diagram of an in-band framing decoder according to the present invention.

The in-band framing apparatus of the present invention also includes an in-band framing decoder, as shown in FIG. 3, having a data input and a data output. The in-band framing decoder continuously operates on internally-reframed data, previously generated by the in-band framing encoder, having a unique-bit-pattern sequence multiplexed with the payload data. The internally-reframed data are transmitted at a internally-reframed-data rate, and include a plurality of time-division-multiplexed frames of payload data having channel integrity maintained by the unique-bit-pattern sequence The in-band framing decoder includes synchronization means, masking means, and channelization means. In FIG. 3, the synchronization means may be embodied as a shift-register chain 320 coupled to a unique-bit-pattern-sequence detector 322. The masking means may be embodied as unique-bit-pattern-sequence masker 312. The channelization means may be embodied as framing-bit inserter 318. Also shown in FIG. 3 are interface 310, data buffer 316 and frame-lock detector 324.

As shown in FIG. 3, the interface 310 is coupled to the unique-bit-pattern-sequence masker 312. The unique-bit-pattern-sequence masker 312 is coupled to data buffer 316. The data buffer 316 is coupled to the framing-bit inserter 318. The interface 310 also is coupled to the shift-register chain 320, which is coupled to unique-bit-pattern-sequence detector 322. The unique-bit-pattern-sequence detector 322 is coupled to the unique-bit-pattern-sequence masker 312, the framing-bit inserter 318, and frame-lock detector 324. The interface 310 also is coupled to the data input, and the framing-bit inserter 318 is coupled to the data output.

Internally-reframed data enter the interface 310, and in parallel go to the unique-bit-pattern sequence masker 312 and to shift-register chain 320. The shift-register chain 320 has sufficient shift registers for storing the plurality of frames of internally-reframed data, which contain the unique-bit-pattern sequence. For example, if the unique-bit-pattern sequence includes 16 bits, which are multiplexed with 16 frames of data, then the shift-register chain 320 has sufficient shift registers for storing 16 frames of internally-reframed data. The unique-bit-pattern-sequence detector 322 detects the presence of the unique-bit-pattern sequence in the internally-reframed data in shift-register chain 320.

The operation of the unique-bit-pattern-sequence detector 322 and shift-register chain 320 can be that of a tapped-delay line. While this is only one method of implementing synchronization means for detecting the unique-bit-pattern sequence, it is well known in the art that many other methods can be used for detecting the unique-bit-pattern sequence in the internally-reframed data, and all such methods are included in the claimed synchronization means of the present invention. Such methods include matched filters and correlation detectors.

In response to detecting the unique-bit-pattern sequence in the internally-reframed data, the unique-bit-pattern-sequence detector 322 generates a synchronization signal which is sent to the unique-bit-pattern-sequence masker 312, the framing-bit inserter 318, and the frame-lock detector 324. The unique-bit-pattern-sequence masker 312, in response to the synchronization signal, masks the unique-bit-pattern sequence embedded in the internally-reframed data, by changing the bits in the unique-bit-pattern sequence to "1" bits. The unique-bit-pattern sequence masker 312 sends the second-payload data to data buffer 316 which buffers the second-payload data for inserting a framing bit. The framing-bit inserter 318, in response to the synchronization signal, inserts a framing bit into the second-payload data which has been buffered by data buffer 316, and outputs the data to data output. The framing-bit inserter 318 thus generates a reframed-bit stream by inserting the external-framing data into the mask data and outputting the reframed-bit stream at the bit rate.

The frame-lock detector 324 determines whether the in-band-framing decoder is in synchronization with the in-band-framing encoder by counting the plurality of frames wherein the unique-bit-pattern-sequence detector 322 has detected the unique-bit-pattern sequence. In response to detecting that the in-band-framing decoder is out of synchronization with the in-band-framing encoder, the frame-lock detector 324 generates an out-of-synchronization signal which may be used to signal an encryption unit or other device.

The present invention also includes a method of using a in-band framing encoder having a data input and data output, for continuously operating on a bit stream having external-framing data and payload data. The bit stream is transmitted at a bit rate, and include a plurality of time-division-multiplexed frames of payload data having channel integrity maintained with external-framing data. The method comprises the steps, performed by the encoder, of detecting the external-framing data of the bit stream, removing the external-framing data from the bit stream, generating an unique-bit-pattern sequence, and multiplexing the unique-bit-pattern sequence with payload data over the plurality of time-division-multiplexed frames of payload data, and thereby generating internally-reframed data having the unique-bit-pattern sequence multiplexed with the payload data. The internally-reframed data are outputted from the data output, at a unique-data rate.

The present invention further includes a method of using an in-band framing decoder having a data input and data output, for continuously operating on internally-reframed data having the unique-bit-pattern sequence multiplexed with the payload data. The internally-reframed data are transmitted at a unique-data rate, and include a plurality of time-division multiplexed frames of payload data having channel integrity maintained with the unique-bit-pattern sequence The method comprises the steps, performed by the decoder, of detecting the unique-bit-pattern sequence in the internally-reframed data, and generating a synchronization signal in response to detecting the unique-bit-pattern sequence. The method further includes masking, in response to the synchronization signal, the unique-bit-pattern sequence in the internally-reframed data. The masking step thereby generates second-payload data. In response to the synchronization signal, the method inserts the external-framing data into the second-payload data for generating a reframed-bit stream. The reframed-bit stream is outputted from the data output at a bit rate.

In operation, as shown in FIG. 1, assume that the channel multiplexer 102 transmits a framed DS1 data stream at 1.544 Mbps for the T1 network. The bit stream is passed to the in-band framing apparatus 104 wherein the in-band framing encoder strips the T1 external-framing data from the bit stream. The bit stream is reduced to the payload data. The in-band framing encoder overlays, by multiplexing, 8 Kbps of a unique-bit-pattern sequence on the payload data. The unique-bit-pattern sequence is multiplexed into user specified DS0 channel and bit positions. The in-band framing apparatus 104 accordingly converts the bit stream from the multiplexer, which is transmitted at a data rate of 1.544 Mbps, to internally-reframed data at 1.536 Mbps, having a unique-bit-pattern sequence multiplexed with payload data. The internally-reframed data are passed to the encryption equipment 106, and unframed encryption data, at the data rate of 1.536 Mbps, are passed to the channel service unit 108. The channel service unit 108 sees the internally-reframed data as a clear channel of 1.536 Mbps of unframed data, and adds 8 Kbps of arbitrary T1 external-framing data, suitable for the T1 network, to the unframed data. The T1 external-framing data leave the channel-service unit 108 at 1.544 Mbps and pass through the communications network 110, which in this example is the T1 network.

Data arrive from the communications network 110 at channel service unit 112, at a data rate of 1.544 Mbps. The channel service unit 112 strips off the 8 Kbps of arbitrary T1 external-framing data that were added to the unframed encrypted data by channel service unit 108. Accordingly, internally-reframed data, which are encrypted, leave channel service unit 112, and are passed through encryption equipment 114, which decrypts the encrypted data as internally-reframed data. The internally-reframed data are sent to the in-band framing apparatus 116. The in-band framing apparatus 116, using the in-band framing decoder, recaptures the programmed unique-bit-pattern sequence embedded in the internally-reframed data, and masks the unique-bit-pattern sequence in the internally-reframed data as "1" bits, thereby generating second-payload data. The in-band framing apparatus 116 inserts external-framing data into their original positions in the second-payload data Accordingly, the in-band framing apparatus 116 converts the unencrypted internally-reframed data to a channelized DS1 signal, as the reframed-bit stream with appropriate timing of 1.544 Mbps for the channel multiplexer 118 on the receiving end.

Figure 4:
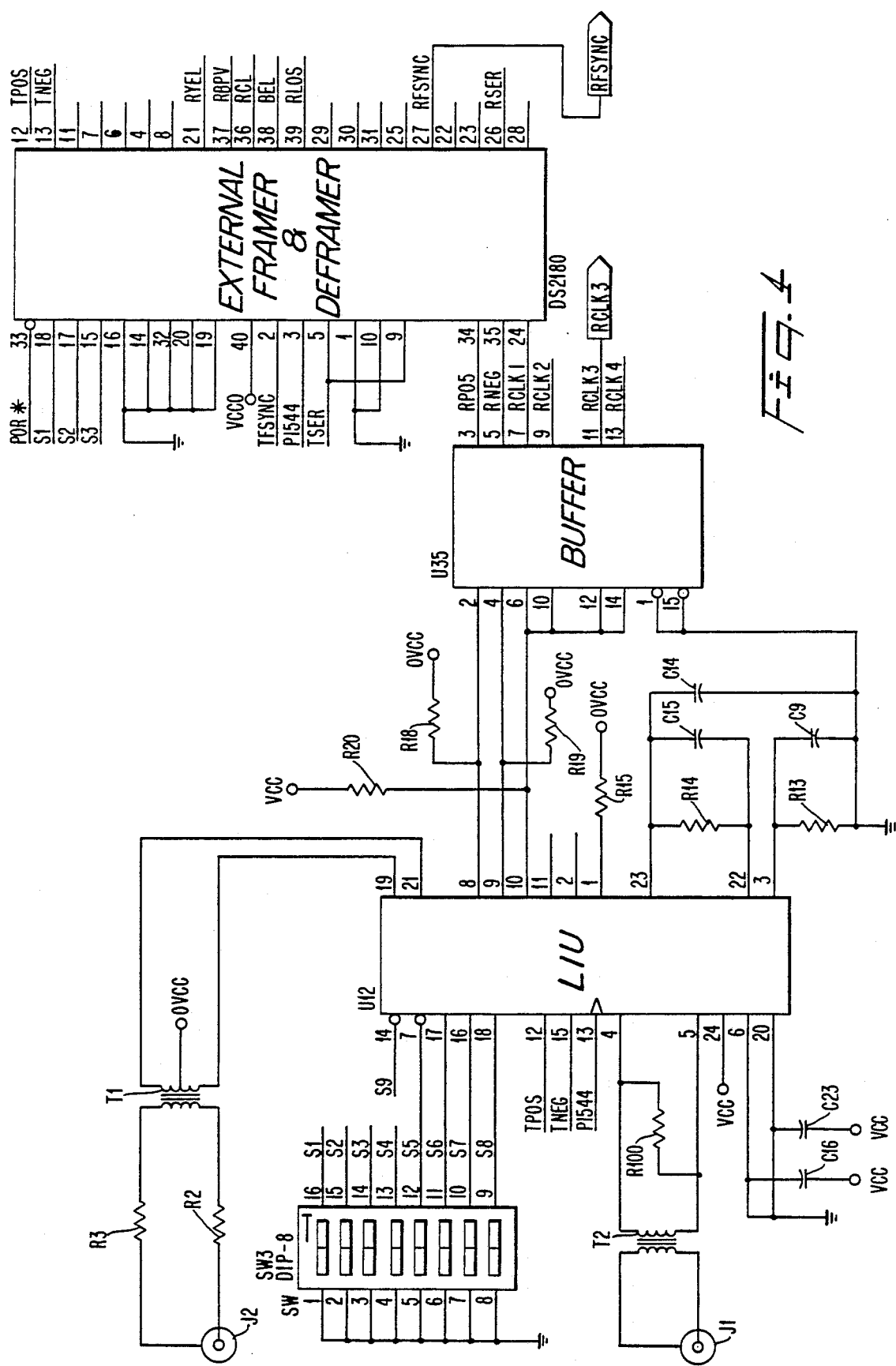
FIG. 4 is a schematic diagram of a circuit for detecting external-framing data according to the present invention.
Figure 11A:
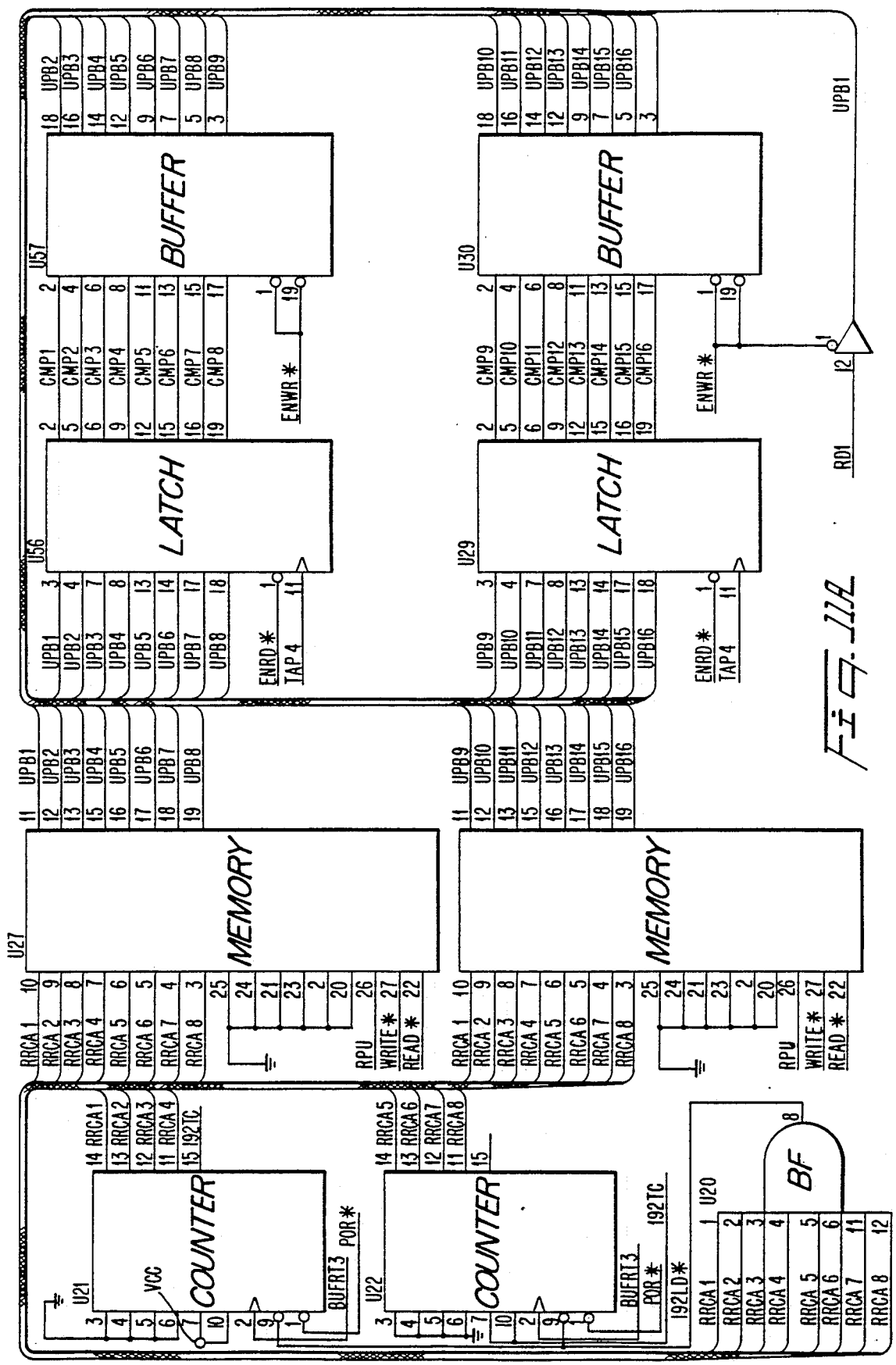

The interface 210 of FIG. 2 can be embodied as a circuit shown in the schematic diagram of FIG. 4, for detecting and deleting external-framing data. The particular embodiment of FIG. 4 detects external-framing data, which are called the F bit for T1 channels, and deletes the F bit.

The unique-bit-pattern-sequence generator 218 of FIG. 2 may be embodied as the schematic diagram of the unique-bit-pattern sequence generator of FIG. 5. The unique-bit-pattern-sequence generator of FIG. 5 is programmable for selecting the unique-bit-pattern. The unique-pattern-insertion logic of FIG. 6 is for selecting the particular bit position of the frames of payload data in which the unique-bit-pattern sequence is to be embedded.

The unique-pattern, first-in-first-out (FIFO) memory controller of FIGS. 7A–7C buffer the unique-bit-pattern sequence, and the multiplexer 216 of FIG. 2 may be embodied as the schematic diagram of the multiplexer according to FIG. 8.

FIGS. 9A–9D are a diagram of T1 loop back logic according to the present invention.

The in-band framing decoder of the present invention includes the interface 310, of FIG. 3, which may be embodied as the interface circuit of FIGS. 10A–10B. A shift-register chain is shown in FIGS. 11A–11D, which are an embodiment of the shift-register chain 320 of FIG. 3. Data from the interface circuit of FIGS. 10A–10B pass through the shift-register chain of FIGS. 11A–11D. The shift-register chain of FIGS. 11A–11D has sufficient shift registers for storing the plurality of frames of internally-reframed data in which the unique-bit-pattern sequence is embedded FIG. 12 is a schematic diagram of a synchronization detector which is an embodiment of the unique-bit-pattern-sequence detector 322 of FIG. 3. The circuitry of FIG. 12 detects the presence of the unique-bit-pattern sequence in the stored frames of internally-reframed data in the shift-register chain of FIGS. 11A–11D. In response to detecting the presence of the unique-bit-pattern sequence in the shift-register chain of FIGS. 11A–11D, the synchronization detector of FIG. 12 generates a synchronization signal, which triggers the unique-bit-pattern sequence masker 312 of FIG. 3, which is embodied as the unique-bit-pattern sequence masker circuit 312 of FIGS. 14A–14C.

Figure 13:
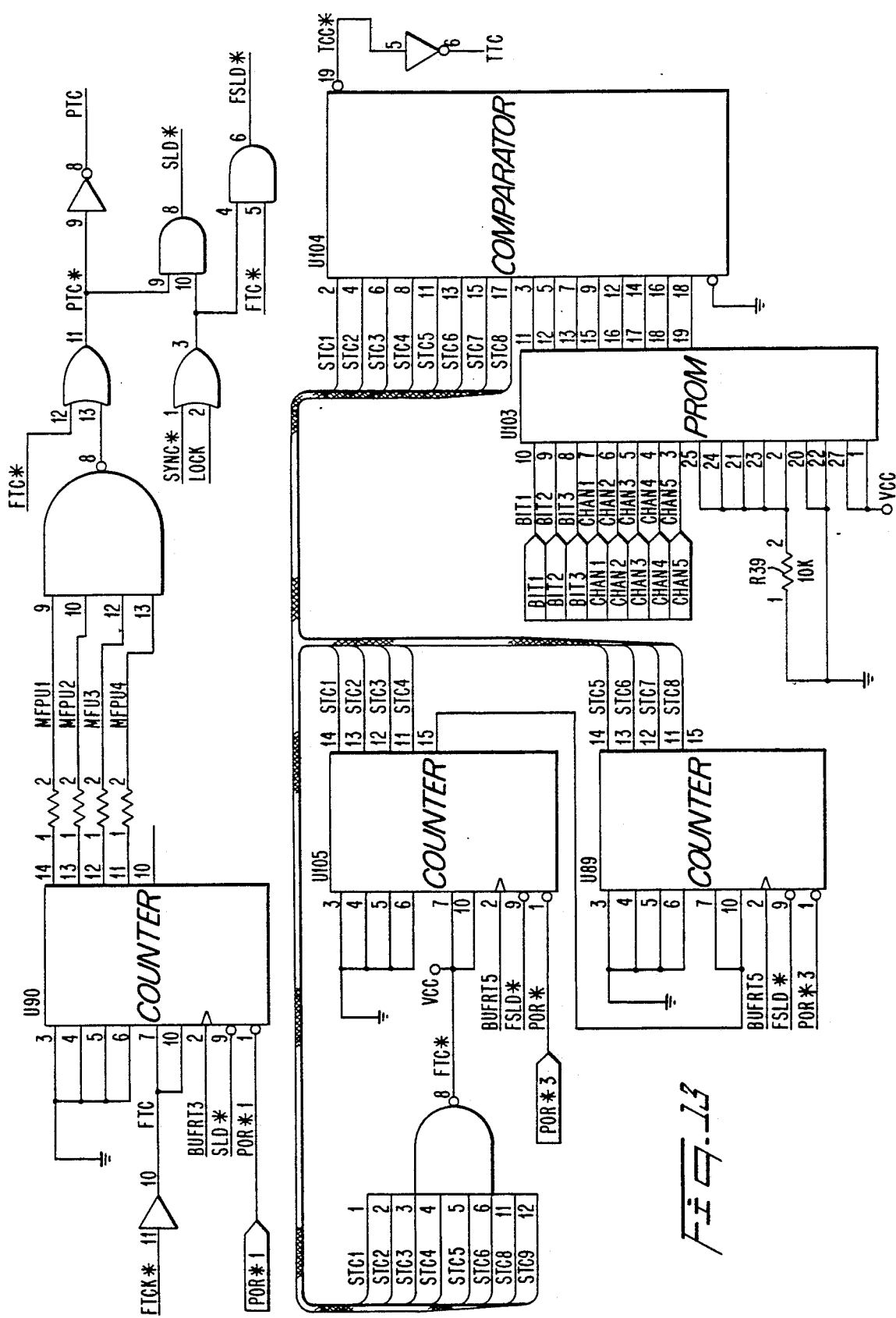
FIG. 13 is schematic diagram of a resynchronization timer according to the present invention.
Figure 13:
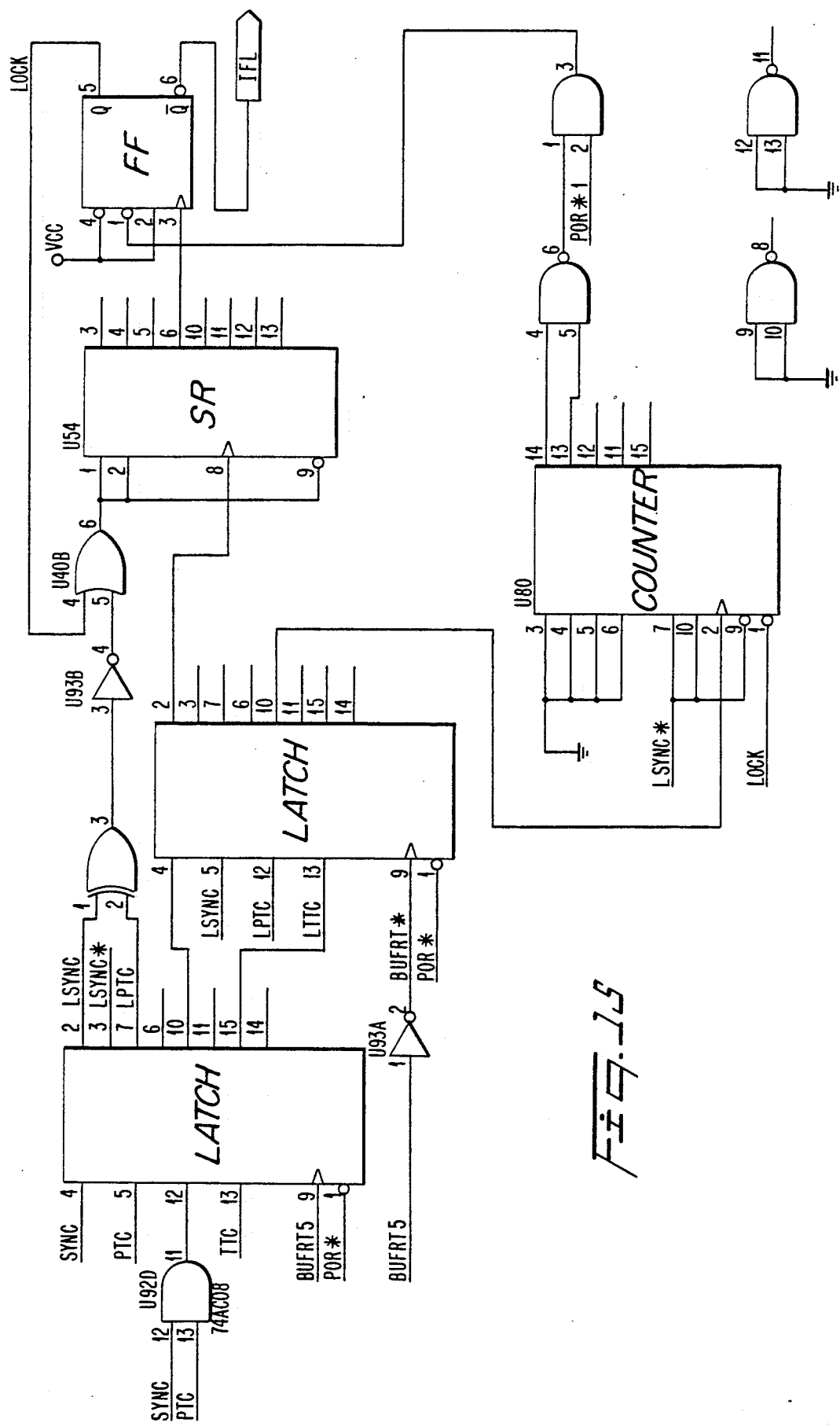

The circuitry of FIGS. 14A–14C masks the bits in the location of the unique-bit-pattern sequence in the internally-reframed data to one bits. FIG. 13 is a schematic diagram of a resynchronization timer, which is, in essence, part of the unique-bit-pattern-sequence detector 322 of FIG. 3. The resynchronization timer provides the necessary timing circuit for generating the external-framing data for the framing-bit inserter 318 of FIG. 3, wherein the external-framing data is inserted into the payload data from the unique pattern sequence masker 312 of FIG. 3. The data buffer 316, of FIG. 3, is included in the schematic diagram of the unique bit-pattern-sequence masker of FIGS. 14A–14C.

Figure 16:
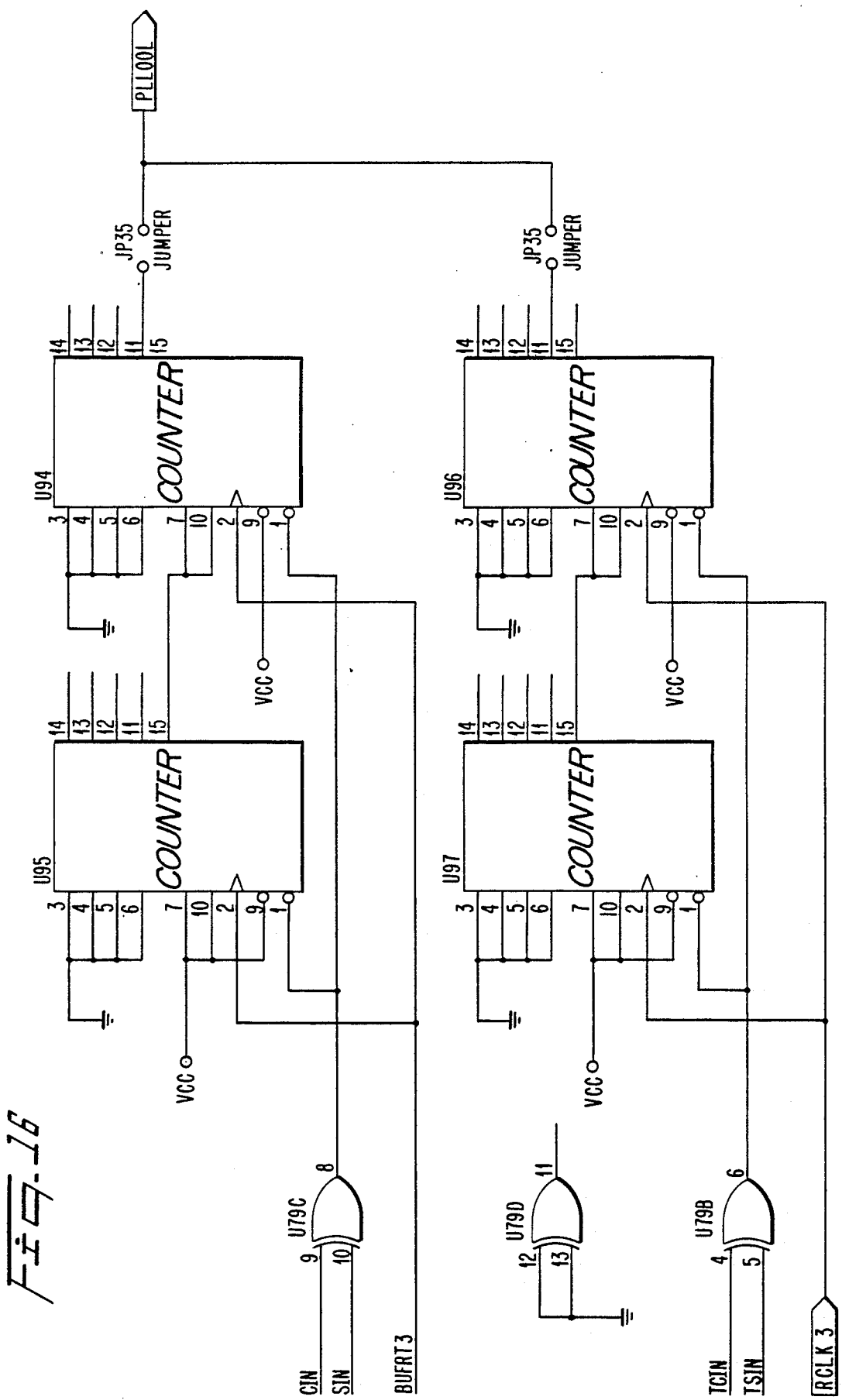
FIG. 16 is a schematic diagram of a phase lock detector circuit according to the present invention.

The frame-lock detector 324 of FIG. 3 may be embodied as the in-band frame-lock detector of FIG. 15, which keeps track of the number of frames that have been in lock with the resynchronization timer. Also shown is a schematic diagram of a phase lock oscillator circuit, FIG. 16, as used in one particular embodiment of the present invention.

Figure 17:
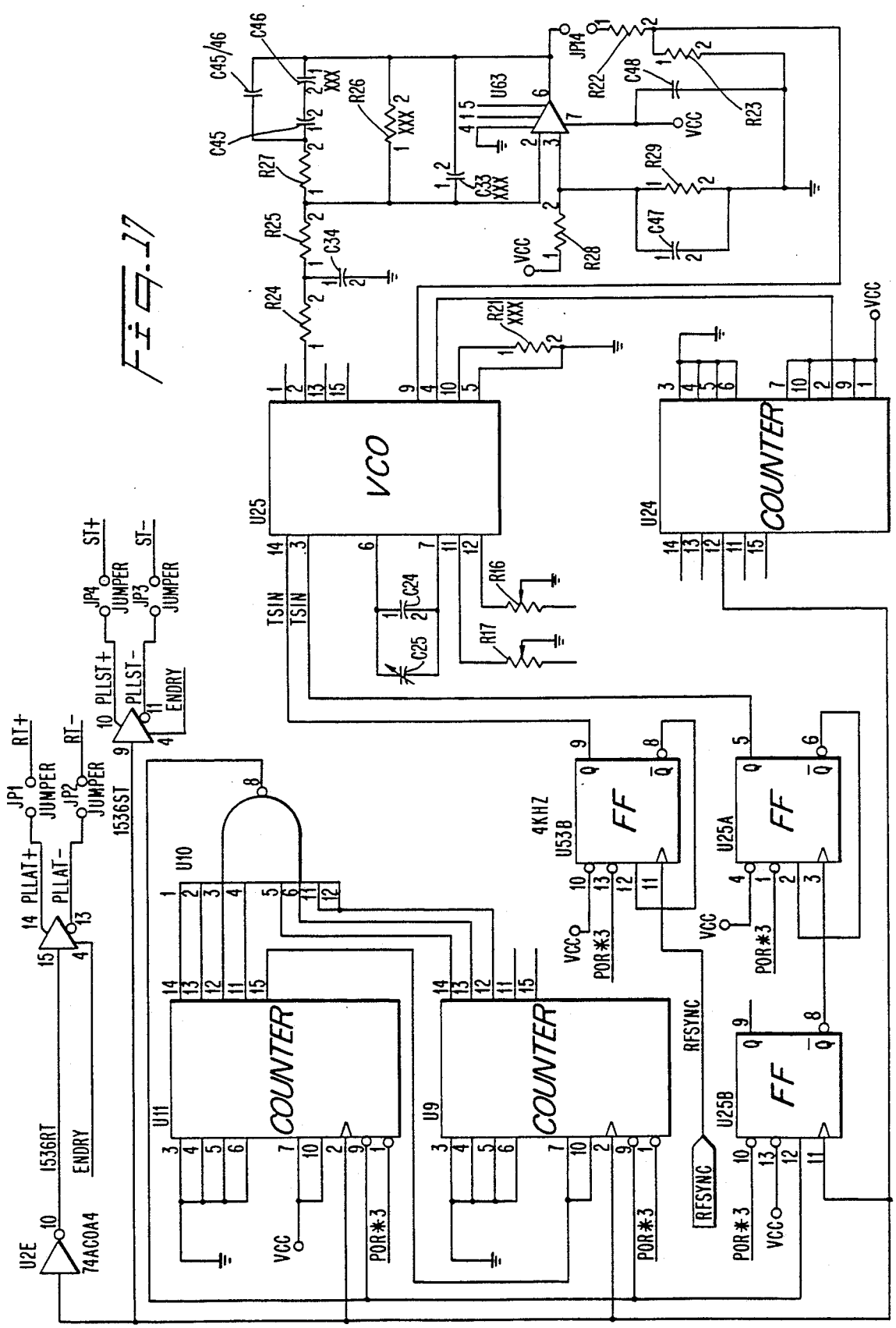
FIG. 17 is a schematic diagram of a phase lock loop according to the present invention.
Figure 18:
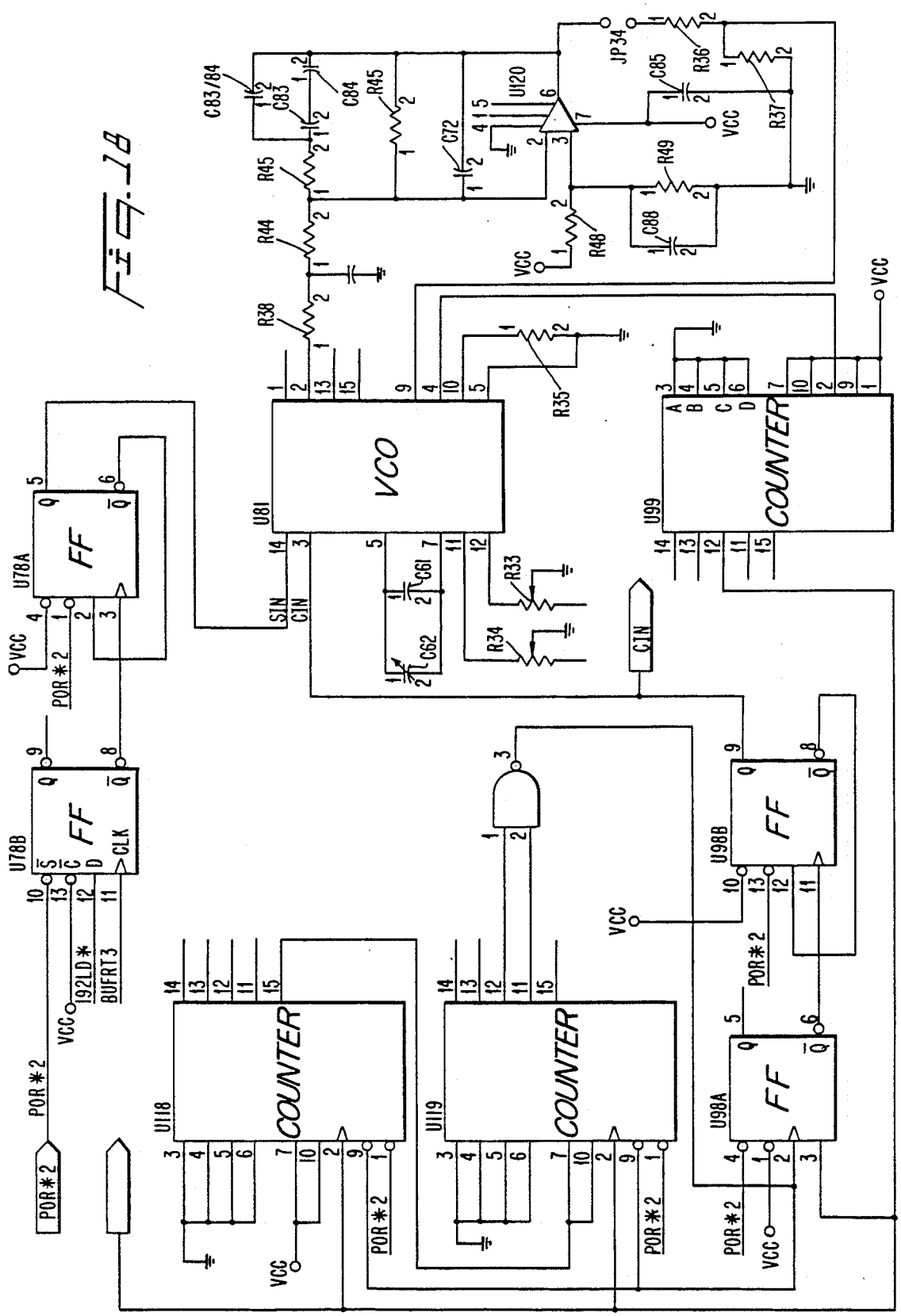
FIG. 18 is a schematic diagram of a phase lock loop according to the present invention.

Also included are a first phase lock loop FIG. 17 and a second phase lock loop FIG. 18, wherein the first phase lock loop is for data rates at 1.536 MbpS, and the second phase lock loop is for data rates of 1.544 Mbps.

It will be apparent to those skilled in the art that various modifications can be made to the in-band framing apparatus of the instant invention with out departing from the scope or spirit of the invention, and it is intended that the present invention cover modifications and variations of the in-band framing apparatus provided they come in the scope of the appended claims and their equivalence. Such modifications and variations include applying the in-band framing apparatus to communications networks other than the T1 network.

I claim:

1. An in-band framing encoder having a data input and a data output, for use with an in-band framing decoder through an encrypted communications channel, for continuously operating on a bit stream having external-framing data and payload data, wherein the bit stream, transmitted at a bit rate, includes a plurality of time-division-multiplexed frames or payload data having channel integrity maintained with external-framing data, said in-band framing encoder comprising:
    means coupled to said data input for detecting the external-framing data of the bit stream;
    means coupled and responsive to said detecting means for removing the external-framing data from the bit stream wherein the data rate of the bit stream is at a second bit rate, with the second bit rate being less than the first bit rate, thereby reducing the bit rate of the bit stream to payload data having a data rate slower than the bit stream;
    pattern means for generating a unique-bit-pattern sequence;
    multiplexer means coupled to said pattern means, said removing means and said data output, for multiplexing the unique-bit-pattern sequence with payload data over the plurality of time-division-multiplexed frames of payload data, thereby generating internally-reframed data having the unique-bit-pattern sequence multiplexed with the payload data; and
    wherein said in-band framing decoder reestablishes channel integrity by restoring external-framing data from detecting the unique-bit-pattern sequence in the internally-reframed data.

2. The in-band framing encoder as set forth in claim 1 wherein said detecting means includes a framing-bit detector for detecting external-framing data of the bit stream.

3. The in-band framing encoder as set forth in claim 1 wherein said removing means includes a framing bit remover.

4. The in-band framing encoder as set forth in claim 1 wherein said pattern generating means includes a unique-bit-pattern-sequence generator.

5. The in-band framing encoder as set forth in claim 1 wherein said pattern multiplexing means includes a multiplexer.

6. An in-band framing encoder having a data input and a data output, for use with an in-band framing decoder through an encrypted communications channel, for operating on a bit stream having external-framing data and payload data, wherein the bit stream includes a plurality of time-division-multiplexed frames of payload data having channel integrity maintained with external-framing data, said in-band framing encoder comprising:
    deletion means coupled to said data input for detecting the external-framing data of the bit stream, and removing the external-framing data from the bit stream;
    pattern means for generating a unique-bit-pattern sequence;
    multiplexer means coupled to said pattern means, said deletion means and said data output, for multiplexing the unique-bit-pattern sequence with payload data over the plurality of time-division-multiplexed frames of payload data, thereby generating internally-reframed data having the unique-bit-pattern sequence multiplexed with the payload data; and
    wherein said in-band framing decoder reestablishes channel integrity by restoring external-framing data from detecting the unique-bit-pattern sequence in the internally-reframed data.

7. The in-band framing encoder as set forth in claim 6 wherein said deletion means includes a framing-bit detector for detecting external-framing data of the bit stream.

8. The in-band framing encoder as set forth in claim 6 wherein said deletion means includes a framing bit remover.

9. The in-band framing encoder as set froth in claim 6 wherein said pattern generating means includes a unique-bit-pattern-sequence generator.

10. The in-band framing encoder as set forth in claim 6 wherein said pattern multiplexing means includes a multiplexer.

11. An in-band framing decoder having a data input and a data output, for use with an in-band framing encoder through an encrypted communications channel, for operating on internally-reframed data having unique-bit-pattern sequence multiplexed with payload data, wherein said internally-reframed data include a plurality of time-division-multiplexed frames of payload data having channel integrity maintained with the unique-bit-pattern sequence, said in-band framing decoder comprising:
    synchronization means coupled to said data input for detecting the unique-bit-pattern sequence in the internally-reframed data, and in response to detecting the unique-bit-pattern sequence generating a synchronization signal;
    masking means coupled to said synchronization means and responsive to the synchronization signal for masking the unique-bit-pattern sequence in the internally-reframed data, thereby generating second-payload data; and
    channelization means coupled to said synchronization means and to said data output, for use with an in-band framing encoder through an encrypted communication channel, and responsive to the synchronization signal, for inserting external-framing data into the second-payload data.

12. The in-band framing decoder as set for in claim 11 wherein said synchronization means includes a shift-register chain.

13. The in-band framing decoder as set forth in claim 11 wherein said masking means includes a unique-bit-pattern-sequence masker.

14. The in-band framing decoder as set forth in claim 11 wherein said channelization means includes a framing-bit inserter.

15. An in-band framing decoder having a data input and a data output, for use with an in-band framing encoder through an encrypted communications channel, for continuously operating on internally-reframed data having a unique-bit-pattern sequence multiplexed with payload data, wherein the internally-reframed data, transmitted at a internally-reframed-data rate, include a plurality of time-division-multiplexed frames of payload data having channel integrity maintained with the unique-bit-pattern sequence, said in-band framing decoder comprising:

synchronization means coupled to said data input for detecting the unique-bit-pattern sequence in the plurality of frames of payload data in the internally-reframed data, and in response to detecting the unique-bit-pattern sequence generating a synchronization signal;

masking means coupled to said synchronization means and responsive to the synchorinzation signal for masking the unique-bit-pattern sequence in the internally-reframed data, thereby generating second-payload data; and channelization means coupled to said synchronization means and to said data output, and responsive to the synchorinzation signal, for generating a reframed-bit stream by inserting external-framing data into the second-payload data and outputting the reframed-bit stream at a bit rate.

16. The in-band framing decoder as set for in claim 15 wherein said synchronization means includes a shift-register chain.

17. The in-band framing decoder as set forth in claim 15 wherein said masking means includes a unique-bit-pattern-sequence masker.

18. The in-band framing decoder as set forth in claim 15 wherein said channelization means includes a framing-bit inserter.

19. The in-band framing decoder as set forth in claim 15 further including means for detecting an in-lock and out-of-lock status of a unique-bit-pattern sequence.

20. A method using an in-band framing encoder with an in-band framing decoder through an encrypted communications channel, for operating on a bit stream having external-framing data and payload data, wherein the bit stream includes a plurality of time-division-multiplexed frames of payload data having channel integrity maintained with external-framing data, comprising the steps, performed by said in-band framing encoder and said in-band framing decoder, of:

detecting, with said in-band framing encoder, the external-framing data of the bit stream;

removing, with said in-band framing encoder, the external-framing data from the bit stream;

generating, with said in-band framing encoder, an unique-bit-pattern sequence; and multiplexing, with said in-band framing encoder, the unique-bit-pattern sequence with payload data over the plurality of time-division-multiplexed frames of payload data, and thereby generating internally-reframed data having the unique-bit-pattern sequence multiplexed with the payload data; and reestablishing, with said in-band framing decoder, channel integrity by restoring external framing data from detecting the unique-bit-pattern sequence in the internally-reframed data.

21. A method using an in-band framing encoder having a data input and a data output, for operating on a bit stream having external-framing data and payload data, wherein the bit stream, transmitted at a bit rate, include a plurality of time-division-multiplexed frames of payload data having channel integrity maintained with external-framing data, and using an in-band framing decoder coupled to said in-band framing encoder through an encrypted communications channel, comprising the steps, performed by said in-band framing encoder and said in-band framing decoder, of:

detecting, with said in-band framing encoder, the external-framing data of the bit stream;

removing, with said in-band framing encoder, the external-framing data from the bit stream;

generating, with said in-band framing encoder, an unique-bit-pattern sequence;

multiplexing, with said in-band framing encoder, the unique-bit-pattern sequence with payload data, and thereby generating internally-reframed data having the unique-bit-pattern sequence multiplexed with the payload data;

outputting, from said data output, the internally-reframed data at a internally-reframed-data rate; and reestablishing, with said in-band framing decoder, channel integrity by restoring external framing data from detecting the unique-bit-pattern sequence in the internally-reframed data.

22. A method using an in-band framing decoder having a data input and a data output, for operating on internally-reframed data having a unique-bit-pattern sequence multiplexed with payload data, wherein said internally-reframed data include a plurality of time-division-multiplexed frames of payload data having channel integrity maintained with the unique-bit-pattern sequence, said in-band framing decoder coupled to an in-band framing encoder through an encrypted communications channel, comprising the steps, performed by said in-band framing decoder, of:

detecting a unique-bit-pattern sequence in the internally-reframed data;

generating a synchronization signal in response to detecting the unique-bit-pattern sequence;

masking, in response to the synchronization signal, the unique-bit-pattern sequence in the internally-reframed data; and inserting, in response to the synchronization signal, external-framing data into second-payload data.

23. A method using an in-band framing decoder having a data input and a data output, for operating on internally-reframed data having a unique-bit-pattern sequence multiplexed with payload data, wherein said internally-reframed data, transmitted at a internally-reframed-data rate, include a plurality of time-division-multiplexed frames of payload data having channel integrity maintained with the unique-bit-pattern sequence, said in-band framing decoder coupled to an in-band framing encoder through an encrypted communications channel, comprising the steps, performed by said in-band framing decoder, of:

detecting a unique-bit pattern sequence in the internally-reframed data;

generating a synchronization signal in response to detecting the unique-bit-pattern sequence;

masking, in response to the synchronization signal, the unique-bit-pattern sequence in the internally-reframed data, thereby generating second-payload data;

inserting, in response to the synchronization signal, external-framing data into the second-payload data for generating a bit stream; and outputting from said data output the bit stream at a bit rate.

24. The method as set forth in claim 23 further including the step of detecting an in-lock and out-of-lock status of a unique-bit-pattern sequence.

25. An in-band framing decoder having a data input and a data output, for operating on internally-reframed data having a unique-bit-pattern sequence multiplexed with payload data, wherein said internally-reframed data include a plurality of time-division-multiplexed frames of payload data having channel integrity maintained with the unique-bit-pattern sequence, said in-band framing decoder coupled to an in-band framing encoder through an encrypted communications channel, said in-band framing decoder comprising:

synchronization means coupled to said data input for detecting the unique-bit-pattern sequence in the internally-reframed data, and in response to detecting the unique-bit-pattern sequence generating a synchronization signal; and restoring means coupled to said synchronization means and responsive to the synchronization signal for masking the unique-bit-pattern sequence in the internally-reframed data, thereby generating second-payload data, and inserting external-framing data into the second-payload data.

26. An in-band framing decoder having a data input and a data output, for use with an in-band framing encoder through an encrypted communications channel, for operating on internally-reframed data having a unique-bit-pattern sequence multiplexed with payload data, wherein said internally-reframed data include a plurality of time-division-multiplexed frames of payload data having channel integrity maintained with the unique-bit-pattern sequence, said in-band framing decoder comprising:

synchronization means coupled to said data input for detecting the unique-bit-pattern sequence in the internally-reframed data, and in response to detecting the unique-bit-pattern sequence generating a synchronization signal; and restoring means coupled to said synchronization means and responsive to the synchronization signal for inserting external-framing data into the internally-reframed data for reestablishing channel integrity in the internally-reframed data.

27. A method using an in-band framing decoder having a data input and a data output, for operating on internally-reframed data having a unique-bit-pattern sequence multiplexed with payload data, wherein said internally-reframed data, transmitted at a internally-reframed-data rate, include a plurality of time-division-multiplexed frames of payload data having channel integrity maintained with the unique-bit-pattern sequence, said in-band framing decoder coupled to an in-band framing encoder through an encrypted communications channel, comprising the steps, performed by said in-band framing decoder, of:

detecting a unique-bit-pattern sequence in the internally-reframed data;

generating a synchronization signal in response to detecting the unique-bit-pattern sequence;

inserting, in response to the synchronization signal, external-framing data into the internally-reframed data for reestablishing channel integrity in a bit stream; and outputting from said data output the bit stream at a bit rate.

28. An in-band framing encoder for use with an in-band framing decoder through an encrypted communications channel, for continuously operating on a bit stream having external-framing data and payload data, wherein the bit stream, transmitted at a bit rate, includes a plurality of time-division-multiplexed frames of payload data having channel integrity maintained with external-framing data, said in-band framing encoder comprising:

means for detecting the external-framing data of the bit stream;

means for removing the external-framing data from the bit stream;

pattern means for generating a unique-bit-pattern sequence;

multiplexer means for multiplexing the unique-bit-pattern sequence with payload data over the plurality of time-division-multiplexed frames of payload data, thereby generating internally-reframed data having the unique-bit-pattern sequence multiplexed with the payload data; and wherein said in-band framing decoder reestablishes channel integrity by restoring external-framing data from detecting the unique-bit-pattern sequence in the internally-reframed data.

29. The in-band framing encoder as set forth in claim 28 wherein said detecting means includes a framing-bit detector for detecting external-framing data of the bit stream.

30. The in-band framing encoder as set forth in claim 28 wherein said removing means includes a framing bit remover.

31. The in-band framing encoder as set forth in claim 28 wherein said pattern generating means includes a unique-bit-pattern-sequence generator.

32. The in-band framing encoder as set forth in claim 28 wherein said pattern multiplexing means includes a multiplexer.

33. An in-band framing decoder for operating on internally-reframed data having a unique-bit-pattern sequence multiplexed with payload data, wherein said internally-reframed data include a plurality of time-division-multiplexed frames of payload data having channel integrity maintained with the unique-bit-pattern sequence, said in-band framing decoder used with an in-band framing encoder through an encrypted communications channel, said in-band framing decoder comprising:

synchronization means for detecting the unique-bit-pattern sequence in the internally-reframed data, and in response to detecting the unique-bit-pattern sequence, generating a synchronization signal; and channelization means responsive to the synchronization signal, for inserting external-framing data into the internally-reframed data.

34. The in-band framing decoder as set for in claim 33 wherein said synchronization means includes a shift-register chain.

35. The in-band framing decoder as set forth in claim 33 wherein said channelization means includes a framing-bit inserter.

* * * * *